US012793577B2

(12) United States Patent
Takemura

(10) Patent No.: US 12,793,577 B2
(45) Date of Patent: Nov. 10, 2026

(54) VASCULAR LESION MODEL

(71) Applicant: Asahi Intecc Co., Ltd., Seto (JP)

(72) Inventor: Kazu Takemura, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 319 days.

(21) Appl. No.: 18/433,480

(22) Filed: Feb. 6, 2024

(65) Prior Publication Data

US 2024/0177629 A1 May 30, 2024

Related U.S. Application Data

(63) Continuation of application No. PCT/JP2021/029738, filed on Aug. 12, 2021.

(51) Int. Cl.
*G09B 23/30* (2006.01)

(52) U.S. Cl.
CPC ........... *G09B 23/303* (2013.01); *G09B 23/30* (2013.01)

(58) Field of Classification Search
None
See application file for complete search history.

(56) References Cited

U.S. PATENT DOCUMENTS

| | | | | |
|---|---|---|---|---|
| 6,062,866 A * | 5/2000 | Prom | G09B 23/28 434/268 |
| 6,517,354 B1 * | 2/2003 | Levy | G09B 23/28 434/262 |
| 2008/0076101 A1 * | 3/2008 | Hyde | G09B 23/30 434/272 |
| 2012/0028231 A1 | 2/2012 | Misawa et al. | |

FOREIGN PATENT DOCUMENTS

| | | | | |
|---|---|---|---|---|
| CN | 209859454 U | 12/2019 | |
| CN | 213339308 U * | 6/2021 | G09B 23/28 |
| JP | 2004-275682 A | 10/2004 | |
| JP | 2010-187878 A | 9/2010 | |
| JP | 2012189909 A * | 10/2012 | A61F 2/958 |
| JP | 2020-190583 A | 11/2020 | |
| JP | 2021-067795 A | 4/2021 | |
| JP | 2021067796 A * | 4/2021 | G09B 23/28 |
| WO | 2010016353 A1 | 2/2010 | |

OTHER PUBLICATIONS

Loctite Corporation, Loctite® Technical Data Sheet Product 401 (Year: 1996).*

International Search Report and Written Opinion mailed on Oct. 19, 2021, received for PCT Application PCT/JP2021/029738, filed on Aug. 12, 2021, 09 pages including English Translation.

* cited by examiner

*Primary Examiner* — Dmitry Suhol
*Assistant Examiner* — Ishayu Singh
(74) *Attorney, Agent, or Firm* — XSENSUS LLP

(57) ABSTRACT

A vascular lesion model includes a tubular vascular model, and a lesion model arranged in a lumen of the vascular model. The lesion model includes a plurality of lesions arranged along a longitudinal direction of the vascular model, the plurality of lesions include a first lesion formed of a first polymeric material and a second lesion formed of a second polymeric material. At least a first end portion of the lesion model in the longitudinal direction is fixed to an inner peripheral surface of the vascular model to restrict movement of the lesion model along the longitudinal direction.

20 Claims, 12 Drawing Sheets

VASCULAR LESION MODEL

CROSS-REFERENCE TO RELATED APPLICATION

This application is a continuation application of International Application No. PCT/JP2021/029738, filed Aug. 12, 2021, the contents of which are incorporated herein by reference in their entirety.

TECHNICAL FIELD

The disclosed embodiments relate to a vascular lesion model.

BACKGROUND ART

Medical devices such as guide wires are used for minimally invasive therapy or examination into blood vessels. For example, Patent Literature 1 and Patent Literature 2 disclose simulated blood vessels and lesion models capable of simulating procedures using these medical devices. Patent Literature 1 discloses that, in a simulated blood vessel including a straight tube portion and a stenotic portion, a lipid equivalent portion is enclosed in the stenotic portion. Patent Literature 2 discloses a calcified lesion model having a cylindrical calcified lesion and a lesion surface portion provided in the lumen of the calcified lesion.

CITATION LIST

Patent Literature

Patent Literature 1: JP 2004-275682 A
Patent Literature 2: JP 2020-190583 A

SUMMARY

Technical Problems

It is known that a stenotic or occlusive lesion (hereinafter, also simply referred to as a "lesion") occurring in a human lower limb artery is much longer than, for example, a lesion occurring in a heart coronary artery, and in many cases, calcification occurs not in the entire lesion but only in a part of the lesion. In this regard, in the simulated blood vessel described in Patent Literature 1, there is a problem in that only a short stenosis occurring in the blood vessel is considered, and a long lesion occurring in a lower limb artery is not considered at all. Moreover, the simulated blood vessel described in Patent Literature 1 cannot simulate a lesion including calcification. Furthermore, although the calcified lesion model described in Patent Literature 2 can simulate a lesion including calcification, there is a problem in that a long lesion occurring in a lower limb artery is not considered at all, and a lesion in which calcification occurs only in a part cannot be simulated. Such a problem is not limited to a vascular lesion model that simulates a lesion occurring in a lower limb artery, but is common to a vascular lesion model that simulates a lesion occurring in a coronary artery or another artery.

The disclosed embodiments have been made to solve at least a part of the above-described problems. The disclosed embodiments are directed to realizing, in a vascular lesion model, a lesion model in a mode close to the actual clinical practice by making it possible to easily adjust the length of the lesion model arranged in a vascular model.

Solutions to Problems

The disclosed embodiments have been made to solve at least a part of the above-described problems, and can be realized as the following aspects.

(1) According to an aspect of the disclosed embodiments, a vascular lesion model is provided. The vascular lesion model includes: a tubular vascular model; and a lesion model arranged in a lumen of the vascular model, in which the lesion model includes a plurality of lesions arranged along a longitudinal direction of the vascular model, the plurality of lesions include a first lesion formed of a first polymeric material and a second lesion formed of a second polymeric material, and at least one end portion of the lesion model in the longitudinal direction is fixed to an inner peripheral surface of the vascular model to restrict movement of the lesion model along the longitudinal direction.

According to the configuration, in the lesion model, the length of the lesion model can be easily adjusted by changing the number of the first lesions and the second lesions included in the plurality of lesions arranged along the longitudinal direction of the vascular model. Moreover, since the plurality of lesions include the first lesion formed of the first polymeric material and the second lesion formed of the second polymeric material, the physical properties of the first and second lesions can be easily adjusted by adjusting the first and second polymeric materials. Furthermore, at least one end portion of the lesion model in the longitudinal direction is fixed to the inner peripheral surface of the vascular model, and thus, the movement of the lesion model along the longitudinal direction is restricted. Therefore, even when a medical device in the vascular model is pushed toward the lesion model during a simulation of a procedure using the vascular lesion model, the lesion model can be prevented from moving in the longitudinal direction due to the pushing. As a result, according to the present configuration, the vascular lesion model that realizes the lesion model in a mode close to the actual clinical practice can be provided.

(2) In the vascular lesion model of the above-described aspect, the lesion model may further include a fixation portion that fixes the at least one end portion to the inner peripheral surface of the vascular model, and the fixation portion is formed of a third polymeric material, and is harder than both the first lesion and the second lesion.

According to the configuration, the at least one end portion of the lesion model in the longitudinal direction can be fixed to the inner peripheral surface of the vascular model by the fixation portion. Moreover, since the fixation portion is harder than both the first lesion and the second lesion, a compressed and hardened end tissue among human lesions (for example, a lump of a plaque lesion, a calcified lesion, or the like) can be simulated by the fixation portion.

(3) In the vascular lesion model of the above-described aspect, the first lesion may be harder than the second lesion.

A human lesion often has non-uniform hardness and an uneven hardness distribution. According to the configuration, since the first lesion is harder than the second lesion, the lesion model similar to a human lesion having non-uniform hardness can be realized.

(4) In the vascular lesion model of the above-described aspect, in the lesion model, a plurality of the first lesions and a plurality of the second lesions may be alternately arranged along the longitudinal direction of the vascular model.

According to the configuration, since the lesion model includes the plurality of the first lesions and the plurality of the second lesions, a lesion occurring in a human lower limb artery (a lesion which is much longer than a lesion occurring in a heart coronary artery) can be simulated. Moreover, since the plurality of the first lesions and the plurality of the second lesions are alternately arranged along the longitudinal direction of the vascular model, the lesion model similar to a human lesion having an uneven hardness distribution along the longitudinal direction can be realized.

(5) In the vascular lesion model of the above-described aspect, at least one of the first lesion and the second lesion may include a granular calcified portion harder than both the first polymeric material and the second polymeric material.

According to the configuration, since at least one of the first lesion and the second lesion includes the calcified portion, a lesion including calcification among human lesions can be simulated. Moreover, when any one of the first lesion and the second lesion includes the calcified portion, a lesion including calcification in an uneven fashion along the longitudinal direction of the vascular model can be simulated. When both the first lesion and the second lesion include the calcified portions, a lesion including calcification uniformly along the longitudinal direction of the vascular model can be simulated. Furthermore, since the calcified portion has a granular shape harder than both the first polymeric material and the second polymeric material, the configuration of the calcified portion can be made into a configuration more similar to a calcified portion included in a human lesion.

(6) In the vascular lesion model of the above-described aspect, an outer peripheral surface of the lesion model, which faces the vascular model, may be fixed to the inner peripheral surface of the vascular model to further restrict movement of the lesion model along a circumferential direction.

According to the configuration, the outer peripheral surface of the lesion model, which faces the vascular model, is fixed to the inner peripheral surface of the vascular model, and thus, the movement of the lesion model along the circumferential direction is further restricted. Therefore, even when the medical device in the vascular model is pushed and rotated toward the lesion model during the simulation of the procedure using the vascular lesion model, the lesion model can be prevented from moving in the circumferential direction due to the pushing.

The disclosed embodiments can be realized in various aspects, for example, a lesion model, a vascular lesion model including a vascular model in addition to the lesion model, an organ model that simulates an organ such as a heart, a liver, a brain, or a lower limb, and includes the vascular lesion model, a human body simulation device including the vascular lesion model and the organ model, or a method for controlling the human body simulation device.

EMBODIMENTS OF THE INVENTION

First Embodiment

Figure 1:
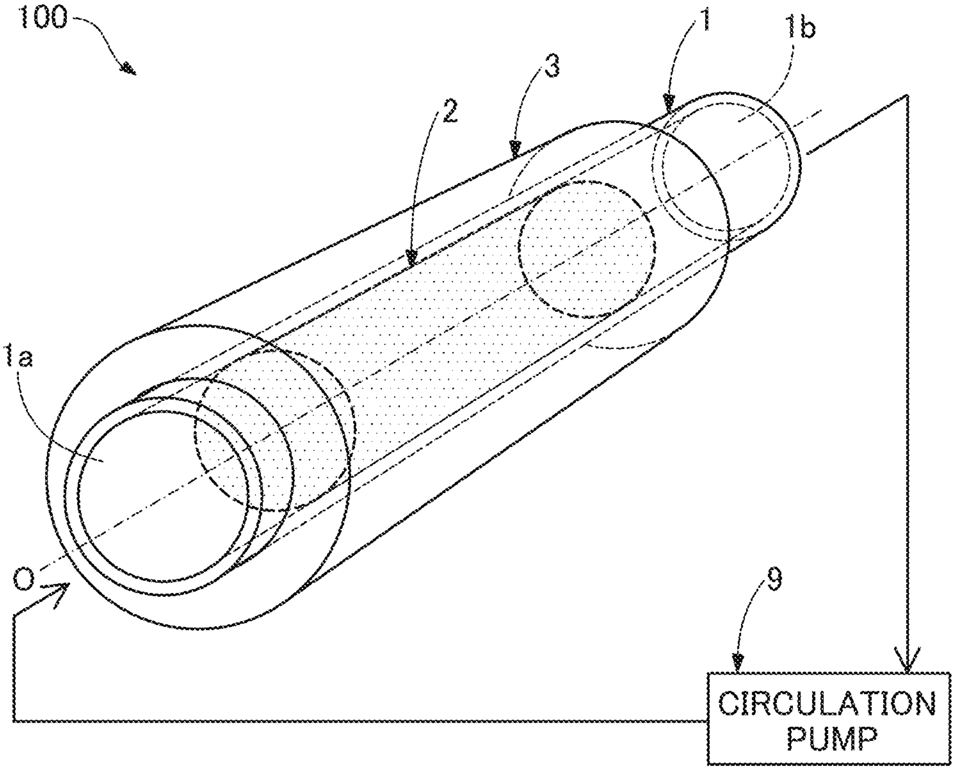
FIG. 1 is a view illustrating a schematic configuration of a vascular simulation device.

FIG. 1 is a view illustrating a schematic configuration of a vascular simulation device 100. The vascular simulation device 100 of the present embodiment is a device used for simulating a procedure of therapy or examination using a medical device for a blood vessel. In the present embodiment, as a medical device, a penetration guide wire that penetrates a biological tissue by a pointed portion at the distal end is illustrated. However, as the medical device, a plasma guide wire that cuts a biological tissue by streamer discharge may be used, and in addition, general devices for minimally invasive therapy or examination, such as a well-known catheter or guide wire, may be used. The vascular simulation device 100 includes a vascular model 1, a lesion model 2, an outer tissue model 3, and a circulation pump 9. Hereinafter, the vascular model 1 and the lesion model 2 are also collectively referred to as "vascular lesion model 1, 2".

In FIG. 1, an axis passing through the centers of the vascular model 1, the lesion model 2, and the outer tissue model 3 is represented by an axis line O (dash-dot line). In the subsequent examples, all of an axis passing through the center of the vascular model 1, an axis passing through the center of the lesion model 2, and an axis passing through the center of the outer tissue model 3 coincide with the axis line O. However, the axis passing through the center of each of the vascular model 1, the lesion model 2, and the outer tissue model 3 may be different from the axis line O. For convenience of explanation, FIG. 1 and the subsequent drawings include a portion illustrated in such a way that relative ratios of sizes of respective components are different from actual relative ratios. Moreover, FIG. 1 and the subsequent drawings include a portion where a part of each component is exaggeratedly illustrated.

The vascular model 1 is a model that simulates a human blood vessel. The vascular model 1 has a tubular shape (in other words, a long substantially hollow cylindrical shape) having openings 1*a* and 1*b* at both ends, and the lesion model 2 that simulates a human lesion is arranged on the inside (lumen 1L illustrated in FIG. 2). Details of the lesion model 2 will be described below. The outer tissue model 3 that simulates human muscle, fat, skin, or the like is arranged on the outside of the vascular model 1 so as to surround at least a part of the outer peripheral surface of the vascular model 1 (in the illustrated example, a central portion excluding both ends of the vascular model 1). The outer tissue model 3 is formed of a soft synthetic resin (for example, polyvinyl alcohol (PVA), silicone). The circulation pump 9 is, for example, a non-positive displacement type centrifugal pump. The circulation pump 9 is provided in the middle of the flow passage connecting the opening 1*a* and the opening 1*b* of the vascular model 1, and circulates a fluid discharged from the opening 1*b* to supply the fluid to the opening 1*a*.

Figure 2:
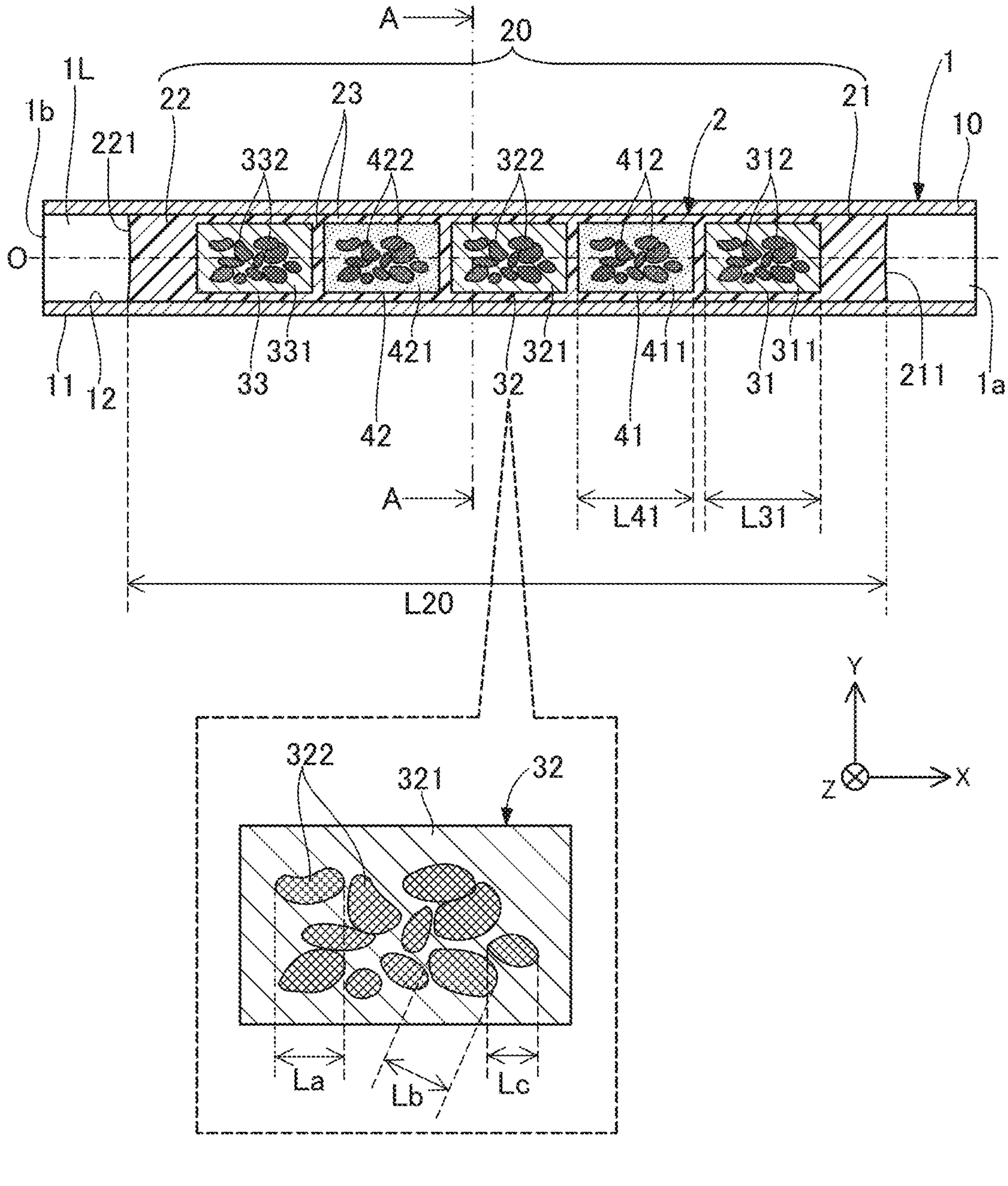
FIG. 2 is an explanatory view illustrating a sectional configuration of a vascular lesion model.

FIG. 2 is an explanatory view illustrating a sectional configuration of the vascular lesion model 1, 2. FIG. 2 illustrates X-, Y-, and Z-axes that are orthogonal to one another. The X-axis corresponds to a longitudinal direction of the vascular lesion model 1, 2 (the vascular model 1 and the lesion model 2), the Y-axis corresponds to a height direction of the vascular lesion model 1, 2, and the Z-axis corresponds to a width direction of the vascular lesion model 1, 2. The left side of FIG. 2 (in the −X-axis direction) is referred to as a "distal end side" of the vascular lesion model 1, 2. When an antegrade approach is adopted, the distal end side is a side far from an insertion site for the medical device (distal, far side). The right side of FIG. 2 (in the +X-axis direction) is referred to as a "proximal end side" of the vascular lesion model 1, 2. When the antegrade approach is adopted, the proximal end side is a side near the insertion site for the medical device (proximal, near side). These points are common to FIG. 2 and the subsequent drawings.

The upper part of FIG. 2 illustrates a longitudinal sectional configuration of the vascular lesion model 1, 2. The lower part of FIG. 2 (in a dashed line balloon) illustrates an enlarged view of a first lesion 32 of the lesion model 2 in the upper part of FIG. 2. As illustrated in the upper part of FIG. 2, the vascular model 1 has a tubular blood vessel portion 10 that simulates a human lower limb artery. The blood vessel portion 10 has the openings 1*a* and 1*b* at both ends, and has the lumen 1L on the inside, through which simulated blood (for example, a fluid such as physiological saline) flows. The blood vessel portion 10 can be formed of any material. The blood vessel portion 10 can be formed of, for example, a polysaccharide such as agarose, sodium alginate, cellulose, starch, or glycogen, or a resin such as silicone, latex, or polyurethane, in addition to PVA having slidability and elasticity similar to those of a human blood vessel. The inner diameter, the outer diameter, and the length in the X-axis direction of the blood vessel portion 10 can be freely determined.

The lesion model 2 is a model that simulates a human lesion, and is arranged in the lumen 1L of the blood vessel portion 10. As illustrated in the upper part of FIG. 2, the lesion model 2 has three first lesions 31, 32, and 33, two second lesions 41 and 42, and a fixation portion 20. Hereinafter, the first lesions 31, 32, and 33 and the second lesions 41 and 42 are also collectively referred to simply as "a plurality of lesions". The plurality of lesions are arranged along the longitudinal direction (i.e., the X-axis direction) of the vascular model 1. In the example of the upper part of FIG. 2, the three first lesions 31, 32, and 33 and the two second lesions 41 and 42 are alternately arranged along the longitudinal direction of the vascular model 1. Specifically, in the example of the upper part of FIG. 2, the three first lesions 31, 32, and 33 and the two second lesions 41 and 42 are alternately arranged in the order of the first lesion 31, the second lesion 41, the first lesion 32, the second lesion 42, and the first lesion 33 from the +X-axis direction toward the X-axis direction.

Figure 3:
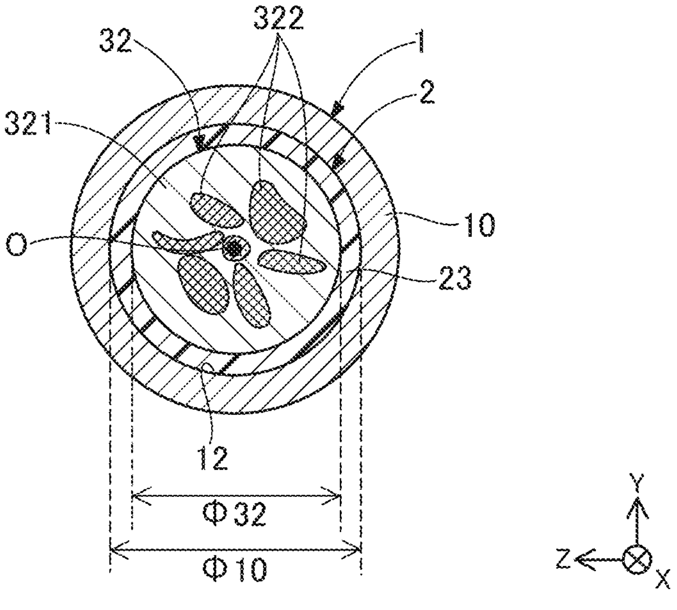
FIG. 3 is an explanatory view illustrating a transverse sectional configuration along a line A-A in FIG. 2.

FIG. 3 is an explanatory view illustrating a transverse sectional configuration along a line A-A in FIG. 2. The configuration of the first lesion 32 will be described with reference to FIG. 3 and the lower part of FIG. 2. The first lesion 32 includes a main body part 321 and a calcified portion 322. As illustrated in FIG. 3, the main body part 321 is a columnar member having an outer diameter Φ32. The outer diameter Φ32 can be freely determined as long as it is smaller than the inner diameter Φ10 of the vascular model 1. In the present embodiment, when the transverse section of the member (or the lumen) has an elliptical shape, the "outer diameter" and the "inner diameter" adopt a length of the longest part in a freely-selected transverse section. The main body part 321 is formed of a first polymeric material. As the first polymeric material, in addition to agarose having elasticity similar to that of CTO, gelatin, PVA, urethane, silicone, sodium alginate, cellulose, starch, glycogen, and latex can be adopted.

A plurality of the calcified portions 322 are embedded in the main body part 321. As illustrated in the lower part of FIG. 2 and FIG. 3, each of the calcified portions 322 has a granular shape having a non-uniform shape and size. In other words, the calcified portions 322 may have any shape such as a spherical shape, a polyhedral shape, a columnar shape, or a conical shape. The calcified portions 322 may be thin like a membrane. The lengths La, Lb, and Lc of the calcified portions 322 in the longitudinal direction may be the same or different. The calcified portions 322 can be formed of any material as long as it is harder than the first polymeric material and a second polymeric material (described below). For example, the calcified portions 322 can be formed of paraffin alone or a material obtained by adding stearic acid to paraffin. The main body part 321 of the first lesion 32 may contain, in addition to the calcified portions 322, fine particles that function as a reflector and nanofibers.

The configuration of the first lesion 31 and the configuration of the first lesion 33 are similar to that of the first lesion 32 described above. In the present embodiment, "similar" and "same" mean substantially equal, and mean that a difference caused by a manufacturing error or the like is allowed without being limited to the case of strictly matching.

As illustrated in the upper part of FIG. 2, the second lesion 41 includes a main body part 411 and a calcified portion 412. Similarly to the main body part 321 of the first lesion 32, the main body part 411 is a columnar member having an outer diameter smaller than the inner diameter Φ10 of the vascular model 1. The outer diameter of the main body part 411 and the outer diameter Φ32 of the main body part 321 may be the same or different. The main body part 411 is formed of the second polymeric material different from the first polymeric material. As the second polymeric material, in addition to agarose having elasticity similar to that of CTO, gelatin, PVA, urethane, silicone, sodium alginate, cellulose, starch, glycogen, and latex can be adopted. "The first polymeric material is different from the second polymeric material" includes not only a case where materials different from each other are used but also a case where the same materials are used and the concentrations at the time of gelation are varied (i.e., a case where only the concentrations are different is also regarded as different materials).

A plurality of the calcified portions 412 are embedded in the main body part 411. Similarly to the calcified portions 322, each of the calcified portions 412 has a granular shape having a non-uniform shape and size, and may have any shape, thickness, and length. Similarly to the calcified portions 322, the calcified portions 412 can be formed of paraffin alone or a material obtained by adding stearic acid to paraffin. The material of the calcified portions 412 may be the same as or different from the material of the calcified portions 322. The main body part 411 of the second lesion 41 may contain, in addition to the calcified portions 412, fine particles that function as a reflector and nanofibers. The configuration of the second lesion 42 is similar to that of the second lesion 41 described above.

The first lesions 31, 32, and 33 of the present embodiment are harder than the second lesions 41 and 42. Specifically, for example, when the hardness of the first lesion 31 (the entire first lesion 31 including the calcified portions 312) and the hardness of the second lesion 41 (the entire second lesion 41 including the calcified portions 412) are respectively measured using a well-known hardness measuring instrument, the obtained hardness of the first lesion 31 is larger than the hardness of the second lesion 41. In other words, the first lesions 31, 32, and 33 are configured to be harder than the second lesions 41 and 42 by adjusting the above-described first polymeric material, the material of the calcified portions 312, 322, and 332, the density of the calcified portions 312, 322, and 332, and the like.

In the example of the upper part of FIG. 2, the lengths L31 of the first lesions 31, 32, and 33 in the longitudinal direction are the same, but the first lesions 31, 32, and 33 may have different lengths. Moreover, the lengths L41 of the second lesions 41 and 42 in the longitudinal direction are the same, but the second lesions 41 and 42 may have different lengths. Moreover, the lengths L31 and the lengths L41 may be different from each other. The three first lesions 31, 32, and 33 and the two second lesions 41 and 42 are arranged so as to be separated from one another.

The fixation portion 20 is a member that fixes the plurality of lesions (i.e., the first lesions 31, 32, and 33 and the second lesions 41 and 42) in the lumen 1L of the vascular model 1. As illustrated in the upper part of FIG. 2, the fixation portion 20 includes a first fixation portion 21, a second fixation portion 22, and a third fixation portion 23. The length L20 of the fixation portion 20 in the longitudinal direction may be freely determined. In the present embodiment, the length L20 of the fixation portion 20 in the longitudinal direction is synonymous with the length of the lesion model 2 in the longitudinal direction.

The first fixation portion 21 is a portion that is provided more proximal side (+X-axis direction) than the first lesion 31, and is a part that does not include the first lesion 31 on the inside. The end portions of the plurality of lesions on the proximal side (specifically, the end portion of the first lesion 31 on the proximal end side) are fixed to an inner peripheral surface 12 of the vascular model 1 by the first fixation portion 21. In the illustrated example, the first fixation portion 21 is on the inner peripheral surface 12 of the vascular model 1 entirely in the circumferential direction. Moreover, the first fixation portion 21 has an outer surface 211 vertical to the axis line O.

The second fixation portion 22 is a portion that is provided on the more distal side (−X-axis direction) than the first lesion 33 and does not include the first lesion 33 on the inside. The end portions of the plurality of lesions on the distal side (specifically, the end portion of the first lesion 33 on the distal end side) are fixed to the inner peripheral surface 12 of the vascular model 1 by the second fixation portion 22. In the illustrated example, the second fixation portion 22 is on the inner peripheral surface 12 of the vascular model 1 entirely in the circumferential direction. Moreover, the second fixation portion 22 has an outer surface 221 vertical to the axis line O. As described above, the plurality of lesions (i.e., the first lesions 31, 32, and 33 and the second lesions 41 and 42) are restricted from moving along the longitudinal direction of the vascular model 1 by being fixed by the first fixation portion 21 and the second fixation portion 22.

The third fixation portion 23 is between the first fixation portion 21 and the second fixation portion 22, and fills outer peripheral surfaces facing the inner peripheral surface 12 of the vascular model 1 and gaps between adjacent lesions among the plurality of lesions (the first lesions 31, 32, and 33 and the second lesions 41 and 42). The outer peripheral surfaces facing the vascular model 1 (specifically, the outer peripheral surfaces of the first lesions 31, 32, and 33 and the outer peripheral surfaces of the second lesions 41 and 42) among the plurality of lesions are fixed to the inner peripheral surface 12 of the vascular model 1 by the third fixation portion 23. As described above, the plurality of lesions (i.e., the first lesions 31, 32, and 33 and the second lesions 41 and 42) are restricted from moving along the circumferential direction of the vascular model 1 by being fixed by the third fixation portion 23.

The fixation portion 20 is formed of a third polymeric material different from the first and second polymeric materials. As the third polymeric material, in addition to agarose having elasticity similar to that of CTO, gelatin, PVA, urethane, silicone, sodium alginate, cellulose, starch, glycogen, and latex can be adopted. "The third polymeric material is different from the first and second polymeric materials" includes not only a case where materials different from each other are used but also a case where the same materials are used and the concentrations at the time of gelation are varied (in this case, the materials are regarded as different materials).

Figure 4A:
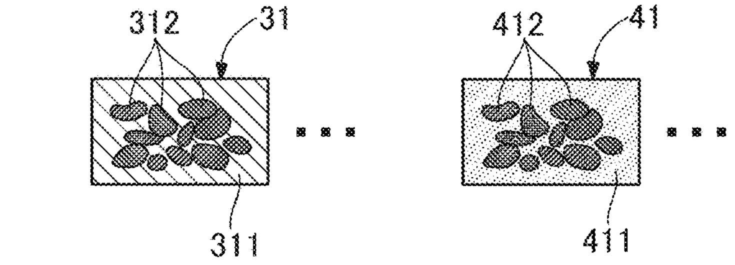
FIGS. 4A to 4D are explanatory views illustrating a production method of the vascular lesion model.

FIGS. 4A to 4D are explanatory views illustrating a production method of the vascular lesion model 1, 2. The vascular lesion model 1, 2 described in FIGS. 1 to 3 can be produced by, for example, the following procedure. FIG. 4A illustrates a state in which the first lesion 31 and the second lesion 41 are prepared.

First, as illustrated in FIG. 4A, the arbitrary number of first lesions 31 to 3*n* (n is an arbitrary natural number, and n=3 is exemplified below) and the arbitrary number of second lesions 41 to 4*m* (m is an arbitrary natural number, and m=2 is exemplified below) are prepared. The first lesion 31 can be formed by pouring a gel-like first polymeric material into a hollow cylindrical mold, embedding the arbitrary number of calcified portions 312 in the gel before the gel is cured, curing the gel, and removing the gel from the mold. The second lesion 41 can be formed by pouring a gel-like second polymeric material into a hollow cylindrical mold, embedding the arbitrary number of calcified portions 412 in the gel before the gel is cured, curing the gel, and removing the gel from the mold.

Figure 4B:
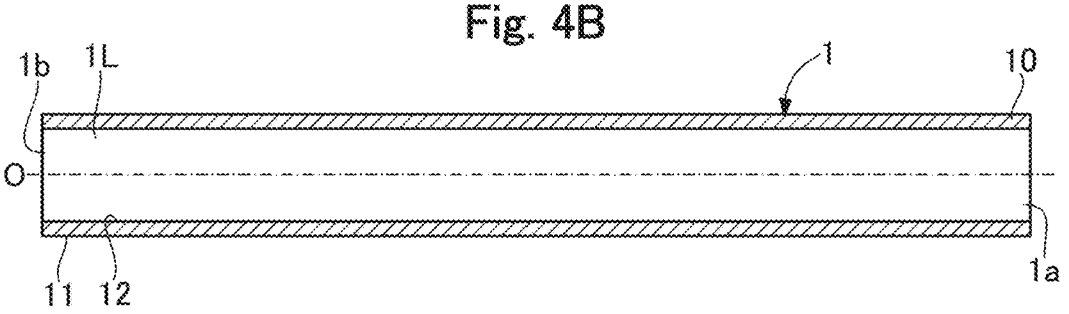
Figure 4C:
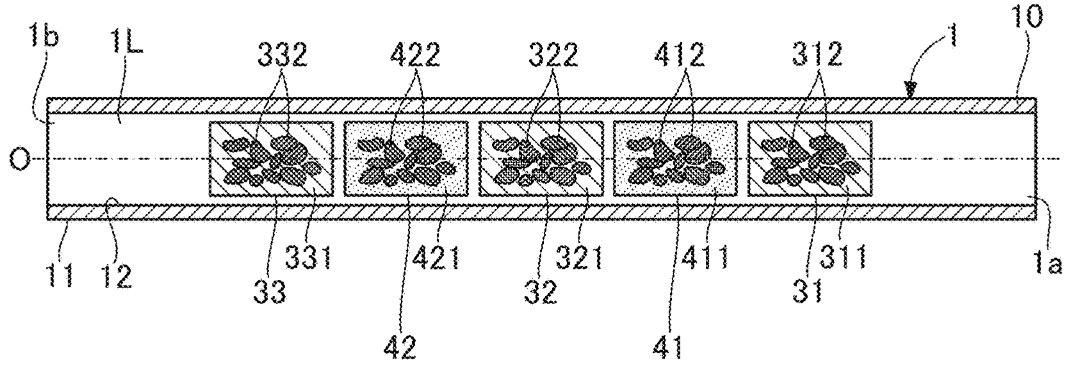
Figure 4D:
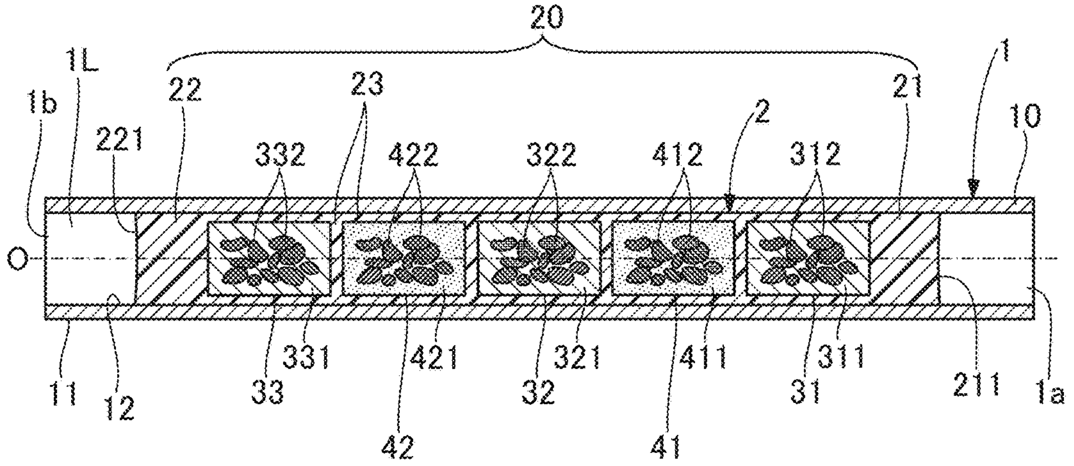

FIG. 4B illustrates a state in which the vascular model 1 is prepared. Next, as illustrated in FIG. 4B, the tubular vascular model 1 formed of a freely-selected polymeric material is prepared. FIG. 4C illustrates a state in which the first lesions 31, 32, and 33 and the second lesions 41 and 42 are arranged in the vascular model 1. The first lesions 31 to 33 and the second lesions 41 to 42 prepared in FIG. 4A are arranged in the lumen 1L of the vascular model 1 prepared in FIG. 4B. In the example of FIG. 4C, the first lesions 31 to 33 and the second lesions 41 to 42 are alternately arranged from the side of the opening 1*a* toward the side of the opening 1*b* so as to be separated from one another. FIG. 4D illustrates a state in which the fixation portion 20 is formed. Next, as illustrated in FIG. 4D, a gel-like third polymeric material is poured and cured.

In the example of FIGS. 4A to 4D, a case where the number of the first lesions 31 to 3*n* is three (n=3) and the number of the second lesions 41 to 4*m* is two (m=2) is illustrated. However, according to the method described in FIGS. 4A to 4D, the number of the first lesions 31 to 3*n* and the number of the second lesions 41 to 4*m* can be easily changed. As a result, the length L20 of the lesion model 2 (the upper part of FIG. 2) along the longitudinal direction (the X-axis direction) of the vascular model 1 can be easily changed. Therefore, by increasing the number of the first lesions 31 to 3*n* and the number of the second lesions 41 to 4*m*, the long lesion model 2 (i.e., the lesion model 2 that simulates a lesion occurring in a human lower limb artery) can be easily produced.

Figure 5:
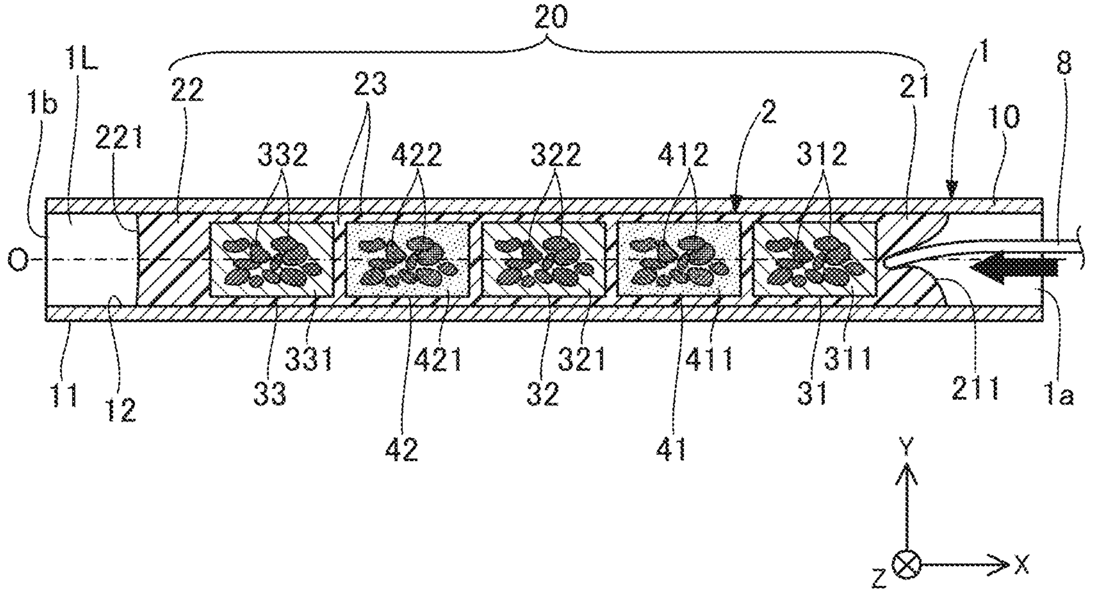
FIG. 5 is a view explaining a simulation of a procedure using the vascular lesion model.

FIG. 5 is a view explaining a simulation of a procedure using the vascular lesion model 1, 2. An operator can simulate a procedure using a medical device for the lesion model 2 by using the vascular simulation device 100 including the above-described vascular lesion model 1, 2. For example, the operator incises a part of the vascular model 1 and inserts a penetration guide wire 8 into the lumen 1L of the vascular model 1 in a state where the circulation pump 9 is operated to circulate a fluid (for example, simulated blood such as physiological saline) in the vascular model 1. Thereafter, the operator delivers the distal end portion of the penetration guide wire 8 to the position of the lesion model 2. For example, as illustrated in the drawing, the operator performs an antegrade approach in which the distal end portion of the penetration guide wire 8 is brought close to the lesion model 2 from the side of the first fixation portion 21. Thereafter, by pushing the penetration guide wire 8 to penetrate the first fixation portion 21, and then, penetrate the first lesion 31, the second lesion 42, the first lesion 32, and the like, the operator can simulate a procedure of opening the lesion model 2. Although the penetration using the penetration guide wire 8 has been described in the example of FIG. 5, the lesion model 2 may be opened by another method (for example, ablation using a plasma guide wire).

As described above, according to the first embodiment, in the lesion model 2 of the vascular lesion model 1, 2, the length L20 of the lesion model 2 (FIG. 2) can be easily adjusted by changing the number of the first lesions 31 to 3*n* and the second lesions 41 to 4*m* included in the plurality of lesions arranged along the longitudinal direction (the X-axis direction) of the vascular model 1. Moreover, since the plurality of lesions include the first lesions 31 to 3*n* formed of the first polymeric material and the second lesions 41 to 4*m* formed of the second polymeric material, the physical properties (mechanical properties, thermal properties, electrical properties, magnetic properties, and optical properties) of the first lesions 31 to 3*n* and the second lesions 41 to 4*m* can be easily adjusted by adjusting the first and second polymeric materials. Furthermore, both end portions of the lesion model 2 in the longitudinal direction are fixed to the inner peripheral surface 12 of the vascular model 1, and thus, the movement of the lesion model 2 along the longitudinal direction is restricted. Therefore, as described in FIG. 5, even when the medical device 8 in the vascular model 1 is pushed toward the lesion model 2 during the simulation of the procedure using the vascular lesion model 1, 2, the lesion model 2 can be prevented from moving in the longitudinal direction due to the pushing. As a result, according to the configuration of the first embodiment, the vascular lesion model 1, 2 that realizes the lesion model 2 in a mode close to the actual clinical practice can be provided.

Moreover, according to the first embodiment, the outer peripheral surface of the lesion model 2, which faces the vascular model 1, is fixed to the inner peripheral surface 12 of the vascular model 1 by the third fixation portion 23, and thus, the movement of the lesion model 2 along the circumferential direction is further restricted. Therefore, as described in FIG. 5, even when the medical device 8 in the vascular model 1 is pushed and rotated toward the lesion model 2 during the simulation of the procedure using the vascular lesion model 1, 2, the lesion model 2 can be prevented from moving in the circumferential direction due to the pushing. Moreover, since the third fixation portion 23 also fills the gaps between adjacent lesions, the movement of the lesion model 2 in the longitudinal direction and the circumferential direction can be even more prevented, and a false lumen occurring in an actual blood vessel and lesion can be simulated by generating a crack between the vascular model 1 and the fixation portion 20 due to the pushing of the medical device 8.

Furthermore, according to the first embodiment, both end portions of the lesion model 2 in the longitudinal direction can be fixed to the inner peripheral surface 12 of the vascular model 1 by the first fixation portion 21 and the second fixation portion 22 of the fixation portion 20. Moreover, since the first fixation portion 21 and the second fixation portion 22 are harder than both the first lesions 31 to 3*n* and the second lesions 41 to 4*m*, a compressed and hardened end tissue among human lesions (for example, a lump of a plaque lesion, a calcified lesion, or the like) can be simulated by the first fixation portion 21 and the second fixation portion 22.

A human lesion often has non-uniform hardness and an uneven hardness distribution. In this regard, according to the vascular lesion model 1, 2 of the first embodiment, since the first lesions 31 to 3*n* are harder than the second lesions 41 to 4*m*, the lesion model 2 similar to a human lesion having non-uniform hardness can be realized. Moreover, according to the vascular lesion model 1, 2 of the first embodiment, since the lesion model 2 includes the plurality of first lesions 31 to 3*n* and the plurality of second lesions 41 to 4*m*, a lesion occurring in a human lower limb artery (a lesion which is much longer than a lesion occurring in a heart coronary artery) can be simulated. Furthermore, since the plurality of first lesions 31 to 3*n* and the plurality of second lesions 41 to 4*m* are alternately arranged along the longitudinal direction of the vascular model 1, the lesion model 2 similar to a human lesion having an uneven hardness distribution along the longitudinal direction can be realized.

Furthermore, according to the first embodiment, since the first lesions 31 to 3*n* and the second lesions 41 to 4*m* include the calcified portions 312 and 412, a lesion including calcification among human lesions can be simulated. As described above, when both the first lesions 31 to 3*n* and the second lesions 41 to 4*m* include the calcified portions 312 and 412, a lesion including calcification uniformly along the longitudinal direction of the vascular model 1 can be simulated. Furthermore, since the calcified portions 312 and 412 have a granular shape harder than both the first polymeric material and the second polymeric material, the configuration of the calcified portions 312 and 412 can be made into a configuration more similar to a calcified portion included in a human lesion.

Second Embodiment

Figure 6:
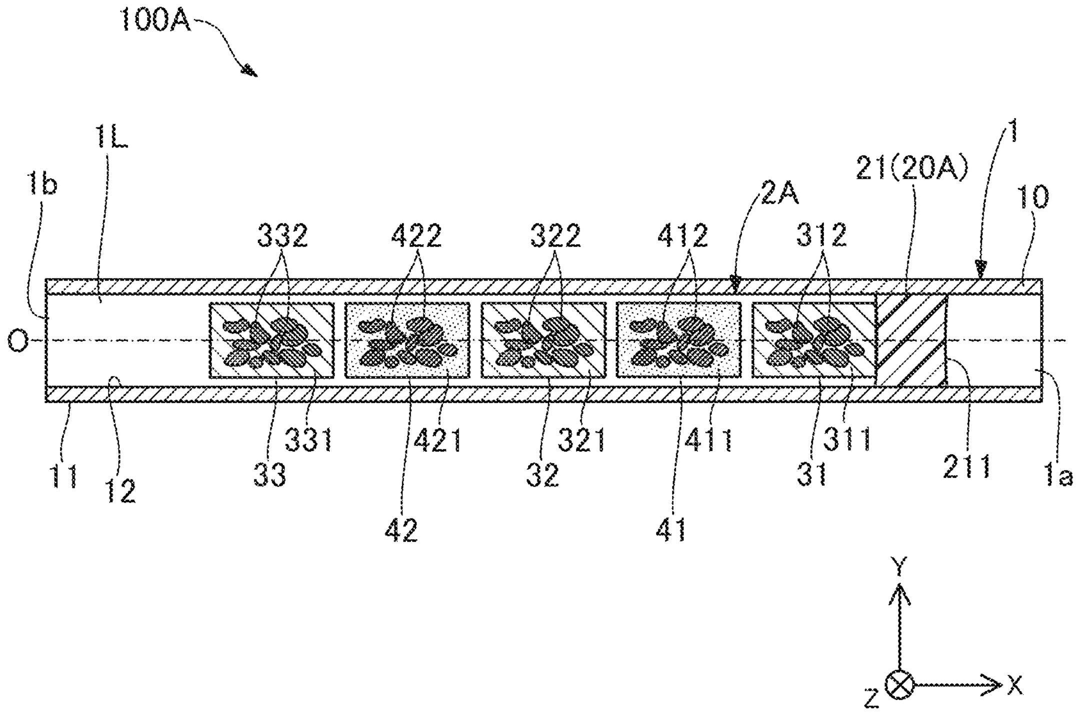
FIG. 6 is an explanatory view illustrating a sectional configuration of a vascular lesion model of a second embodiment.

FIG. 6 is an explanatory view illustrating a sectional configuration of a vascular lesion model 1, 2A of a second embodiment. A vascular simulation device 100A of the second embodiment includes the vascular lesion model 1, 2A instead of the vascular lesion model 1, 2. The vascular lesion model 1, 2A has a lesion model 2A instead of the lesion model 2 in the configuration described in the first embodiment. The lesion model 2A has a fixation portion 20A instead of the fixation portion 20 in the configuration described in the first embodiment. The fixation portion 20A includes only the first fixation portion 21 which is a portion that is provided on the more proximal side (+X-axis direction) than the first lesion 31 and fixes the end portions of the plurality of lesions on the proximal side (the end portion of the first lesion 31 on the proximal end side) to the inner peripheral surface 12 of the vascular model 1. In other words, the fixation portion 20A does not have the second fixation portion 22 and the third fixation portion 23 described in the first embodiment.

As described above, the configuration of the lesion model 2A can be variously changed, and can be made into a configuration in which only one end portions of the plurality of lesions (i.e., the first lesions 31, 32, and 33 and the second lesions 41 and 42) are fixed. Although FIG. 6 illustrates an example in which the end portions of the plurality of lesions on the proximal side are fixed, a configuration in which only the end portions of the plurality of lesions on the distal side (the end portion of the first lesion 33 on the distal end side) are fixed may be adopted.

According to the vascular lesion model 1, 2A of the second embodiment, similar effects to those of the above-described first embodiment can be achieved. Specifically, similarly to FIG. 5, when an antegrade approach in which the distal end portion of the penetration guide wire 8 is brought close to the lesion model 2A from the side of the first fixation portion 21 is performed, the first fixation portion 21 comes into contact with the penetration guide wire 8, and thus, the lesion model 2A can be prevented from moving in the longitudinal direction. Moreover, when a retrograde approach in which the distal end portion of the penetration guide wire 8 is brought close to the lesion model 2A from the side of the first lesion 33 is performed, the first fixation portion 21 supports the plurality of lesions pushed in the +X-axis direction by the penetration guide wire 8, and thus, the lesion model 2A can be prevented from moving in the longitudinal direction.

Third Embodiment

Figure 7:
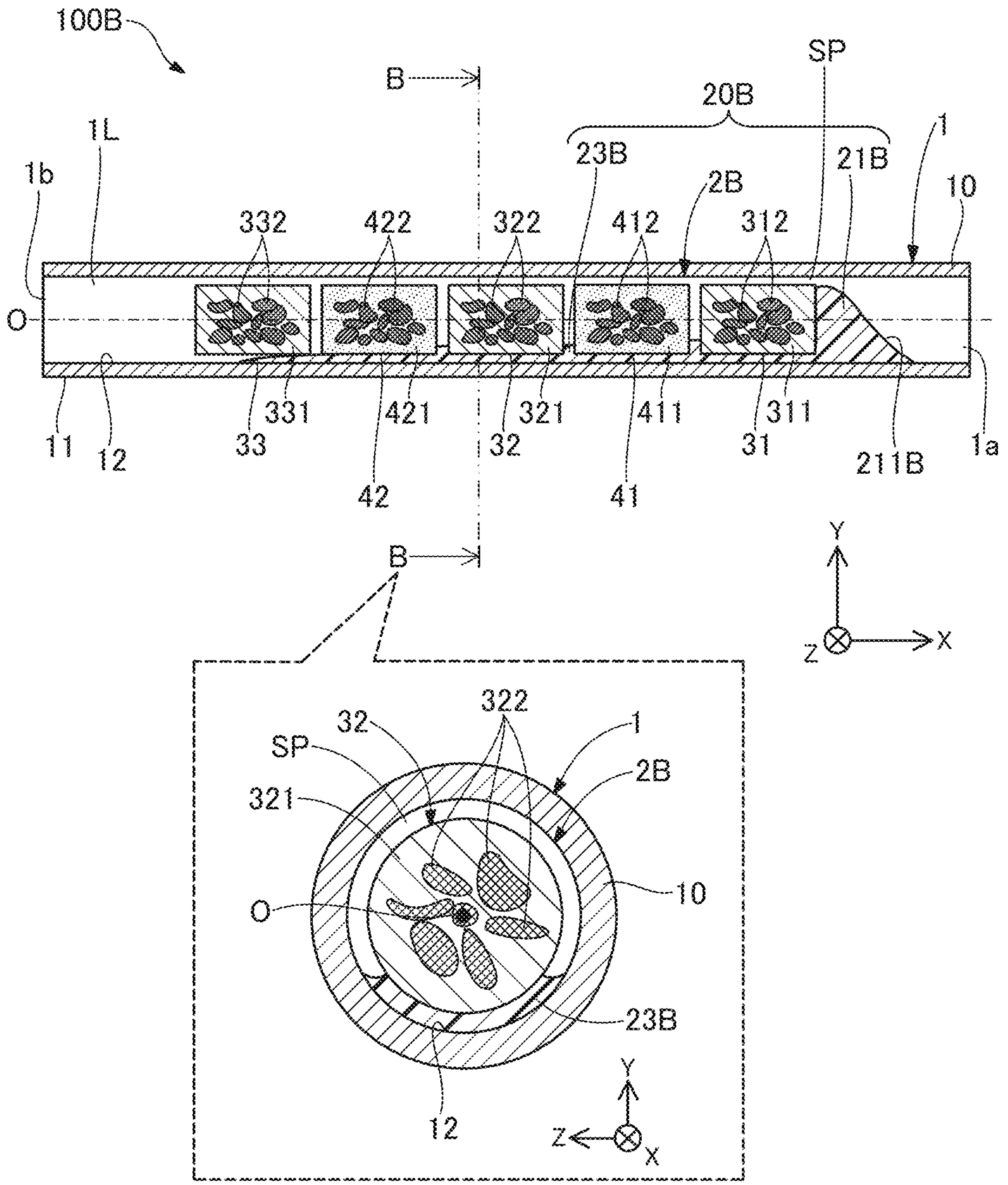
FIG. 7 is an explanatory view illustrating a sectional configuration of a vascular lesion model of a third embodiment.

FIG. 7 is an explanatory view illustrating a sectional configuration of a vascular lesion model 1, 2B of a third embodiment. The upper part of FIG. 7 illustrates a longitudinal sectional configuration of the vascular lesion model 1, 2B. The lower part of FIG. 7 (in a dashed line balloon) illustrates a transverse sectional configuration along a line B-B of the vascular lesion model 1, 2B. A vascular simulation device 100B of the third embodiment includes the vascular lesion model 1, 2B instead of the vascular lesion model 1, 2. The vascular lesion model 1, 2B has a lesion model 2B instead of the lesion model 2 in the configuration described in the first embodiment. The lesion model 2B has a fixation portion 20B instead of the fixation portion 20 in the configuration described in the first embodiment.

The fixation portion 20B includes a first fixation portion 21B and a third fixation portion 23B. The first fixation portion 21B is a portion that is provided on the more proximal side (+X-axis direction) than the first lesion 31, and is a part that does not include the first lesion 31 on the inside. The end portions of the plurality of lesions on the proximal side (specifically, the end portion of the first lesion 31 on the proximal end side) are fixed to the inner peripheral surface 12 of the vascular model 1 by the first fixation portion 21B. As illustrated in the upper part of FIG. 7, the first fixation portion 21B is provided on a part of the inner peripheral surface 12 of the vascular model 1 in the circumferential direction. Therefore, in the part on which the first fixation portion 21B is provided, a part of the vascular model 1 in the circumferential direction includes a part in which a space SP exists between the inner peripheral surface 12 and the first fixation portion 21B. In the vascular lesion model 1, 2B of the third embodiment, a fluid can flow through the space SP. Moreover, an outer surface 211B of the first fixation portion 21B is not vertical but inclined with respect to the axis line O.

The third fixation portion 23B is on the more distal side (−X-axis direction) than the first fixation portion 21B, and fills a part of outer peripheral surfaces facing the inner peripheral surface 12 of the vascular model 1 and a part of gaps between adjacent lesions among the plurality of lesions (the first lesions 31, 32, and 33 and the second lesions 41 and 42). As illustrated in the lower part of FIG. 7, the third fixation portion 23B is on a part of the inner peripheral surface 12 of the vascular model 1 in the circumferential direction. Therefore, similarly in the part on which the third fixation portion 23B is provided, in a part of the vascular model 1 in the circumferential direction, the space SP exists between the inner peripheral surface 12, the plurality of lesions, and the third fixation portion 23B. In the vascular model 1, the area of the inner peripheral surface 12 covered by the first fixation portion 21B and the third fixation portion 23B can be freely determined.

As described above, the configuration of the lesion model 2B can be variously changed, and the shape of the first fixation portion 21B may be freely changed. Specifically, the first fixation portion 21B may have the outer surface 211B inclined with respect to the axis line O, and may not be provided on the inner peripheral surface 12 of the vascular model 1 entirely in the circumferential direction. The same applies to the second fixation portion 22 when the second fixation portion 22 is provided in the lesion model 2B. Moreover, the shape of the third fixation portion 23B may be freely changed. Specifically, the third fixation portion 23B may not be provided on the inner peripheral surface 12 of the vascular model 1 entirely in the circumferential direction. According to the vascular lesion model 1, 2B of the third embodiment, similar effects to those of the above-described first embodiment can be achieved. Moreover, according to the vascular lesion model 1, 2B of the third embodiment, the lesion model 2B that simulates a stenotic lesion can be provided.

Fourth Embodiment

Figure 8:
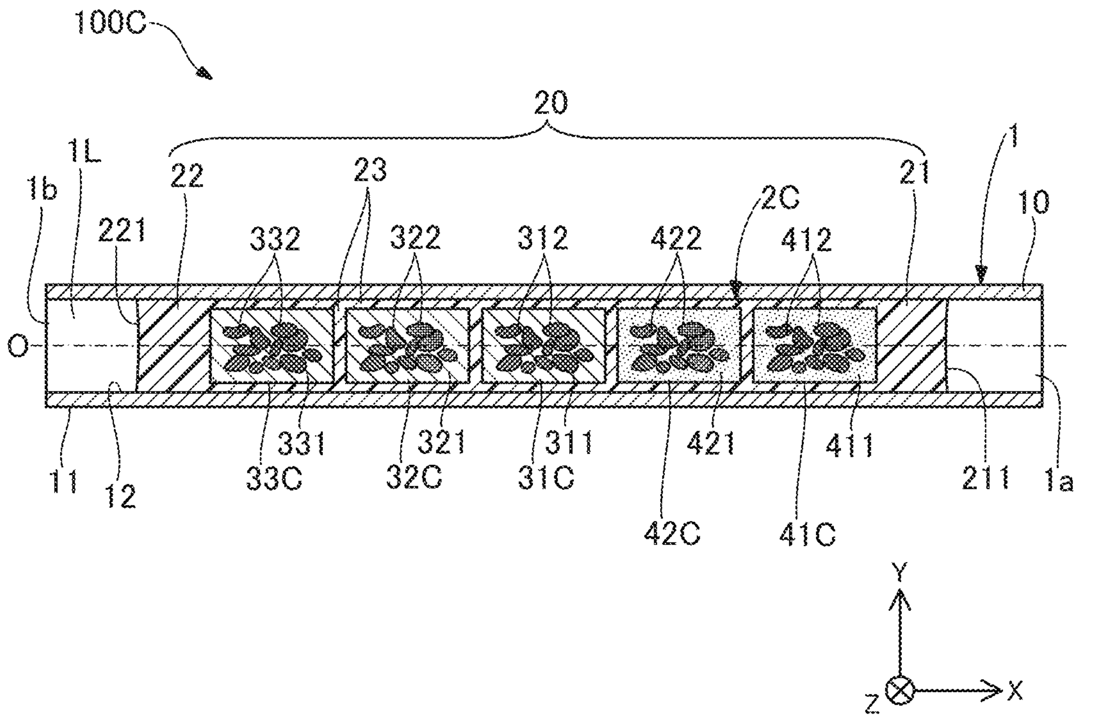
FIG. 8 is an explanatory view illustrating a sectional configuration of a vascular lesion model of a fourth embodiment.

FIG. 8 is an explanatory view illustrating a sectional configuration of a vascular lesion model 1, 2C of a fourth embodiment. A vascular simulation device 100C of the fourth embodiment includes the vascular lesion model 1, 2C instead of the vascular lesion model 1, 2. The vascular lesion model 1, 2C has a lesion model 2C instead of the lesion model 2 in the configuration described in the first embodiment. The lesion model 2C includes three first lesions 31C, 32C, and 33C and two second lesions 41C and 42C in the configuration described in the first embodiment. The plurality of lesions are arranged in the order of the second lesion 41C, the second lesion 42C, the first lesion 31C, the first lesion 32C, and the first lesion 33C from the +X-axis direction toward the −X-axis direction.

As described above, the configuration of the lesion model 2C can be variously changed, and the first lesions 31C, 32C, and 33C and the second lesions 41C and 42C may not be alternately arranged. In the illustrated example, the three first lesions 31C, 32C, and 33C, the two second lesions 41C and 42C, and an example of the arrangement thereof are illustrated. However, the number of the first lesions n and the number of the second lesions m may be freely changed. Moreover, the arrangement of the n first lesions and the arrangement of the m second lesions can also be freely changed.

According to the vascular lesion model 1, 2C of the fourth embodiment, similar effects to those of the above-described first embodiment can be achieved. Moreover, since "the hardness of the first lesion 31 is larger than the hardness of the second lesion 41" as described in the first embodiment, in the lesion model 2C of the fourth embodiment, the lesion model 2C having a hardness distribution with various modes can be produced by adjusting the number of the first lesions n and the number of the second lesions m, and the arrangement of the n first lesions and the arrangement of the m second lesions in the lesion model 2C.

Fifth Embodiment

Figure 9:
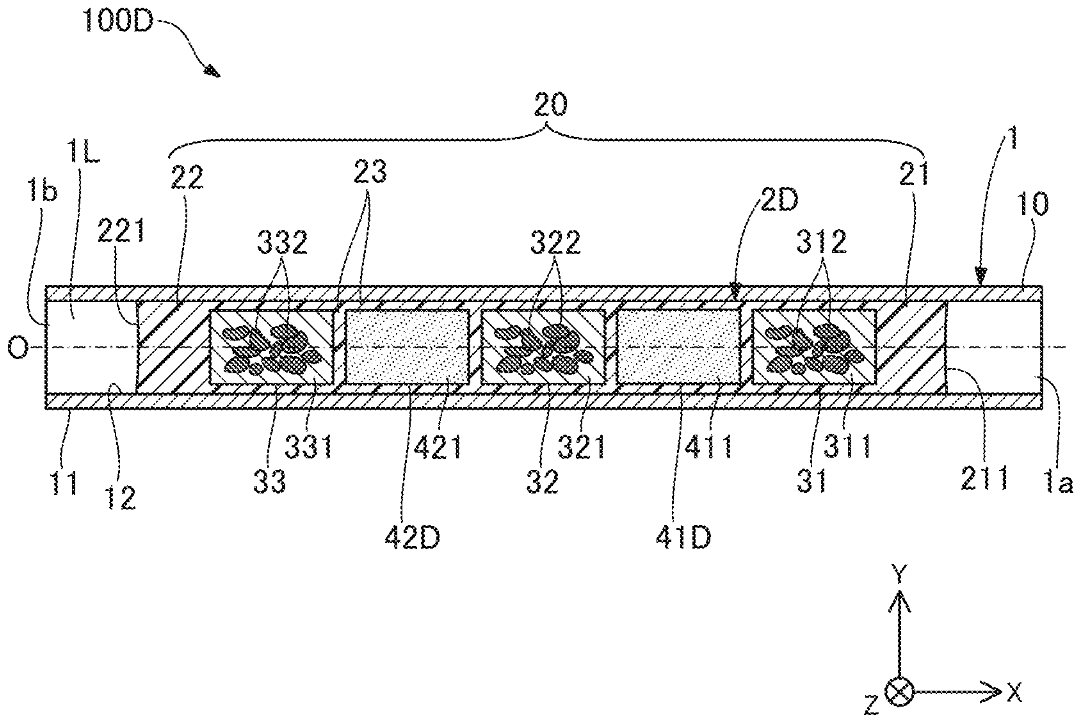
FIG. 9 is an explanatory view illustrating a sectional configuration of a vascular lesion model of a fifth embodiment.

FIG. 9 is an explanatory view illustrating a sectional configuration of a vascular lesion model 1, 2D of a fifth embodiment. A vascular simulation device 100D of the fifth embodiment includes the vascular lesion model 1, 2D instead of the vascular lesion model 1, 2. The vascular lesion model 1, 2D has a lesion model 2D instead of the lesion model 2 in the configuration described in the first embodiment. The lesion model 2D has a second lesion 41D instead of the second lesion 41 and has a second lesion 42D instead of the second lesion 42 in the configuration described in the first embodiment. The second lesion 41D and the second lesion 42D are composed only of the main body parts 411 and 421 that do not include the calcified portions 412 and 422.

As described above, the configuration of the lesion model 2D can be variously changed, and may be made into a configuration having the second lesions 41D and 42D that do not include calcified portions. In the illustrated example, although a case where the second lesions 41D and 42D do not include calcified portions is illustrated, a configuration in which the first lesions 31, 32, and 33 do not include calcified portions may be adopted.

According to the vascular lesion model 1, 2D of the fifth embodiment, similar effects to those of the above-described first embodiment can be achieved. A lesion that does not include a calcified portion is softer than a lesion that includes a calcified portion. Therefore, according to the configuration of the fifth embodiment, the lesion model 2D having a wider hardness distribution can be produced by mixing the second lesions 41D and 42D that do not include calcified portions and the first lesions 31, 32, and 33 that include the calcified portions 312, 322, and 332. In other words, as described in the vascular lesion model 1, 2D of the fifth embodiment, when any one of the first lesions 31, 32, and 33 and the second lesions 41D and 42D include calcified portions, a lesion including calcification in an uneven fashion along the longitudinal direction of the vascular model 1 can be simulated.

Sixth Embodiment

Figure 10:
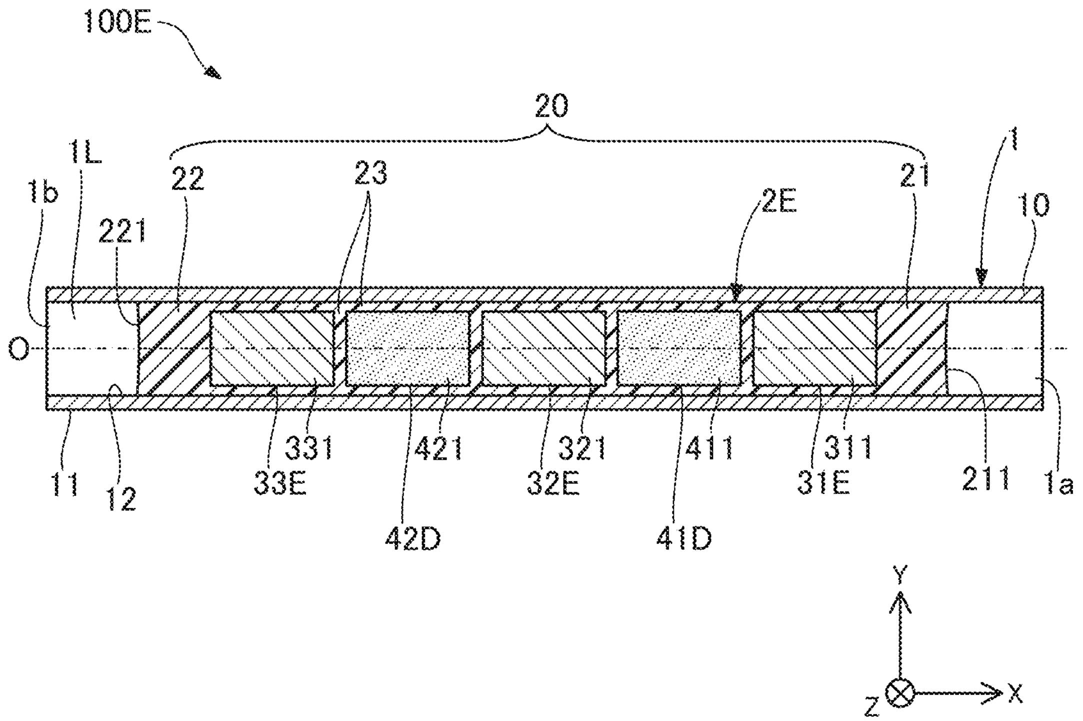
FIG. 10 is an explanatory view illustrating a sectional configuration of a vascular lesion model of a sixth embodiment.

FIG. 10 is an explanatory view illustrating a sectional configuration of a vascular lesion model 1, 2E of a sixth embodiment. A vascular simulation device 100E of the sixth embodiment includes the vascular lesion model 1, 2E instead of the vascular lesion model 1, 2. The vascular lesion model 1, 2E has a lesion model 2E instead of the lesion model 2D in the configuration described in the fifth embodiment. The lesion model 2E has a first lesion 31E instead of the first lesion 31, has a first lesion 32E instead of the first lesion 32, and has a first lesion 33E instead of the first lesion 33 in the configuration described in the fifth embodiment. All of the first lesions 31E, 32E, and 33E are composed only of the main body parts 311, 321, and 331 that do not include the calcified portions 312, 322, and 332.

As described above, the configuration of the lesion model 2E can be variously changed, and may be made into a configuration in which both the first lesions 31E, 32E, and 33E and the second lesions 41D and 42D do not include calcified portions. Also in this case, since "the hardness of the first lesion 31E is larger than the hardness of the second lesion 41D," the lesion model 2E having a hardness distribution with various modes can be produced by adjusting the number of the first lesions n and the number of the second lesions m, and the arrangement of the n first lesions and the arrangement of the m second lesions in the lesion model 2E.

According to the vascular lesion model 1, 2E of the sixth embodiment, similar effects to those of the above-described first embodiment can be achieved. Moreover, in the lesion model 2E of the sixth embodiment, since the labor and cost when the first lesions 31E, 32E, and 33E and the second lesions 41D and 42D are produced can be reduced, the lesion model 2E can be produced more easily and at lower cost.

Seventh Embodiment

Figure 11:
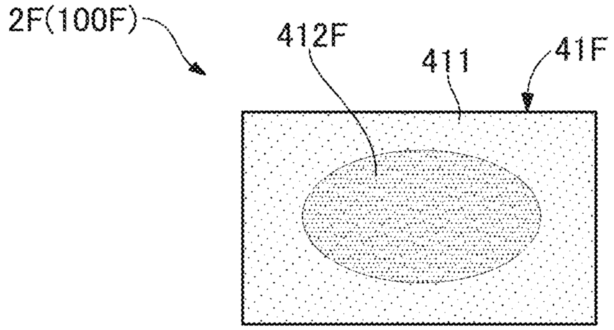
FIG. 11 is an explanatory view illustrating a sectional configuration of a second lesion of a seventh embodiment.

FIG. 11 is an explanatory view illustrating a sectional configuration of a second lesion 41F of a seventh embodiment. A vascular simulation device 100F of the seventh embodiment includes a vascular lesion model 1, 2F instead of the vascular lesion model 1, 2. The vascular lesion model 1, 2F has a lesion model 2F instead of the lesion model 2 in the configuration described in the first embodiment. The lesion model 2F has a second lesion 41F instead of the second lesion 41 in the configuration described in the first embodiment. As illustrated in FIG. 11, the second lesion 41F does not have the calcified portion 412 described in the first embodiment, and includes a central portion 412F harder than the main body part 411 inside the main body part 411. In the illustrated example, the central portion 412F has a flat spherical shape, but may have any shape. For example, the central portion 412F may be formed by using the same material as that of the main body part 411 and increasing the concentration at the time of gelation, or may be formed by using a material different from that of the main body part 411.

As described above, the configuration of the second lesion 41F can be variously changed, and may be made into a configuration having the central portion 412F harder than the main body part 411 instead of the calcified portion 412. The same applies to the second lesion 42 and the first lesions 31, 32, and 33. According to the vascular lesion model 1, 2F of the seventh embodiment, similar effects to those of the above-described first embodiment can be achieved.

Eighth Embodiment

Figure 12:
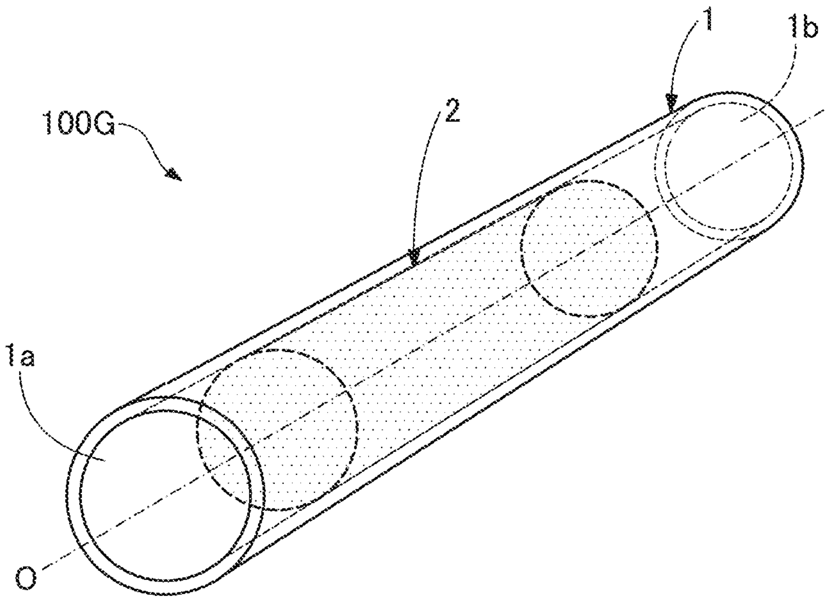
FIG. 12 is a view illustrating a schematic configuration of a vascular simulation device of an eighth embodiment.

FIG. 12 is a view illustrating a schematic configuration of a vascular simulation device 100G of an eighth embodiment. The vascular simulation device 100G of the eighth embodiment does not include the outer tissue model 3 and the circulation pump 9 in the configuration described in the first embodiment. The vascular lesion model 1, 2 of the vascular simulation device 100G may be used after being wetted by a fluid (for example, simulated blood such as physiological saline), or may be used in a dry state. Moreover, the vascular simulation device 100G may include, for example, a water tank that can be filled with a fluid, and the vascular lesion model 1, 2 may be used while being placed in the water tank filled with the fluid. According to the vascular simulation device 100G of the eighth embodiment, similar effects to those of the above-described first embodiment can be achieved.

Modified Examples of Present Embodiment

The disclosed embodiments are not limited to the embodiments described above and can be implemented in various modes without departing from the spirit thereof, and, for example, the following modifications are also possible.

Modified Example 1

In the first to eighth embodiments, examples of the configurations of the vascular simulation devices 100 and 100A to 100G have been described. However, the configuration of the vascular simulation device 100 can be variously changed. For example, the vascular simulation device 100 may have an organ model that simulates an organ such as a heart, a liver, a brain, or a lower limb. In this case, the vascular lesion model 1, 2 may be provided outside or inside the organ model. For example, the vascular simulation device 100 may include a pulsation pump for applying a motion that simulates pulsation to the fluid circulated by the circulation pump 9. As the pulsation pump, for example, a positive displacement type reciprocation pump or a rotary pump rotated at a low speed can be used.

Modified Example 2

In the first to eighth embodiments, examples of the configurations of the vascular lesion models 1, 2 and 2A to 2F have been described. However, the configuration of the vascular lesion model 1, 2 can be variously modified. For example, the vascular model 1 may have any shape such as a curved shape or a meandering shape in addition to a linear shape. For example, the outer peripheral surface 11 or the inner peripheral surface 12 of the vascular model 1 may be coated with a hydrophilic or hydrophobic resin.

Modified Example 3

In the first to eighth embodiments, examples of the configurations of the lesion models 2 and 2A to 2F have been described. However, the configuration of the lesion model 2 can be variously changed. For example, in the lesion model 2, the first lesions 31 to 3*n* and the second lesions 41 to 4*m* adjacent to each other may be arranged without a space therebetween and may be in contact with each other. For example, the first lesions 31 to 3*n* and the second lesions 41 to 4*m* may be different from each other in factors other than the hardness (for example, shape and size). For example, at least one of the first lesions 31 to 3*n* and the second lesions 41 to 4*m* may be configured as a lesion in a mode of occluding the lumen 1L of the vascular model 1 by making the outer diameter the same as the inner diameter Φ10 of the vascular model 1.

For example, the first lesions 31 to 3*n* and the second lesions 41 to 4*m* may have the same hardness. For example, the fixation portion 20 may have the same hardness as any one of the first lesions 31 to 3*n* and the second lesions 41 to 4*m*, or may be softer than any one of the first lesions 31 to 3*n* and the second lesions 41 to 4*m*.

Modified Example 4

The configurations of the vascular simulation devices 100 and 100A to 100G or the vascular lesion models 1, 2 and 2A to 2F of the first to eighth embodiments, and the configurations of the vascular simulation devices 100 and 100A to 100G or the vascular lesion models 1, 2 and 2A to 2F of the modified examples 1 to 3 may be combined as appropriate. For example, the vascular lesion model 1, 2 may be configured by combining the fixation portion 20 described in any of the second and third embodiments and the first and second lesions 31 to 3*n* and 41 to 4*m* described in any of the fourth to seventh embodiments. For example, the vascular lesion model 1, 2 described in any of the first to seventh embodiments may be used in the vascular simulation device 100G of the eighth embodiment.

Although the aspects have been described based on the embodiments and the modified examples, the embodiments of the above-described aspects are made for facilitating understanding of the aspects, and do not limit the aspects. The aspects can be modified and improved without departing from the spirit of the aspects and the scope of claims, and include equivalent aspects. Moreover, unless the technical features are described as essential in the present specification, they may be omitted as appropriate.

DESCRIPTION OF REFERENCE NUMERALS

1, 2 vascular lesion model
1 vascular model
2, 2A to 2F lesion model
3 outer tissue model
8 medical device (penetration guide wire)
9 circulation pump
10 blood vessel portion
11 outer peripheral surface
12 inner peripheral surface
20, 20A, 20B fixation portion
21, 21B first fixation portion
22 second fixation portion
23, 23B third fixation portion
31, 31C, 31E first lesion
32, 32C, 32E first lesion
33, 33C, 33E first lesion
41, 41C, 41D, 41F second lesion
42, 42C, 42D second lesion
100, 100A to 100G vascular simulation device
211, 211B outer surface
221 outer surface
311, 321 main body part
312, 322 calcified portion
411 main body part
412 calcified portion
412F central portion

What is claimed is:

1. A vascular lesion model comprising:
a tubular vascular model; and
a lesion model arranged in a lumen of the vascular model, the lesion model including a plurality of lesions arranged along a longitudinal direction of the vascular model, the plurality of lesions including a first lesion formed of a first polymeric material and a second lesion formed of a second polymeric material, different from the first polymeric material, and the lesion model further including a fixation portion that fixes at least a first end of the lesion model in the longitudinal direction to an inner peripheral surface of the vascular model to restrict movement of the lesion model along the longitudinal direction, wherein the fixation portion is formed of a third polymeric material and being harder than both the first lesion and the second lesion, the first lesion and the second lesion are each separated from one another in the longitudinal direction.

2. The vascular lesion model according to claim 1, wherein, in the lesion model, a plurality of the first lesions and a plurality of the second lesions are alternately arranged along the longitudinal direction of the vascular model.

3. The vascular lesion model according to claim 1, wherein at least one of the first lesion and the second lesion includes a granular calcified portion harder than both the first polymeric material and the second polymeric material.

4. The vascular lesion model according to claim 3, wherein an outer peripheral surface of the lesion model, which faces the vascular model, is fixed to the inner peripheral surface of the vascular model to further restrict movement of the lesion model along a circumferential direction.

5. The vascular lesion model according to claim 1, wherein the first polymeric material is harder than the second polymeric material.

6. The vascular lesion model according to claim 1, wherein the first lesion is harder than the second lesion.

7. The vascular lesion model according to claim 6, wherein, in the lesion model, a plurality of the first lesions and a plurality of the second lesions are alternately arranged along the longitudinal direction of the vascular model.

8. The vascular lesion model according to claim 6, wherein at least one of the first lesion and the second lesion includes a granular calcified portion harder than both the first polymeric material and the second polymeric material.

9. The vascular lesion model according to claim 6, wherein an outer peripheral surface of the lesion model, which faces the vascular model, is fixed to the inner peripheral surface of the vascular model to further restrict movement of the lesion model along a circumferential direction.

10. The vascular lesion model according to claim 1, wherein, in the lesion model, a plurality of the first lesions and a plurality of the second lesions are alternately arranged along the longitudinal direction of the vascular model.

11. The vascular lesion model according to claim 1, wherein at least one of the first lesion and the second lesion includes a granular calcified portion harder than both the first polymeric material and the second polymeric material.

12. The vascular lesion model according to claim 11, wherein both the first lesion and the second lesion include the granular calcified portion.

13. The vascular lesion model according to claim 1, wherein an outer peripheral surface of the lesion model, which faces the vascular model, is fixed to the inner peripheral surface of the vascular model to further restrict movement of the lesion model along a circumferential direction.

14. The vascular lesion model according to claim 1, wherein a second end of the lesion model in the longitudinal direction is fixed to the inner peripheral surface of the vascular model to further restrict movement of the lesion model along the longitudinal direction.

15. The vascular lesion model according to claim 1, further comprising a space between at least a part of the fixation portion and part of the inner peripheral surface of the vascular model in a circumferential direction.

16. The vascular lesion model according to claim 1, wherein at least one of the first lesion and the second lesion includes a central portion harder than a main portion.

17. The vascular lesion model according to claim 1, wherein the fixation portion connects the first lesion and the second lesion by filling a gap between the first lesion and the second lesion in the longitudinal direction.

18. The vascular lesion model according to claim 17, wherein a length of the fixation portion arranged between the first lesion and the second lesion in the longitudinal direction is shorter than a length of the first lesion and shorter than a length of the second lesion.

19. The vascular lesion model according to claim 1, wherein the first lesion includes a granular calcified portion harder than both the first polymeric material and the second polymeric material, the second lesion does not include the calcified portion, and the first lesion is harder than the second lesion.

20. The vascular lesion model according to claim 1, wherein at least one of the first lesion and the second lesion is configured to occlude the lumen of the vascular model.

* * * * *